UNITED STATES PATENT OFFICE.

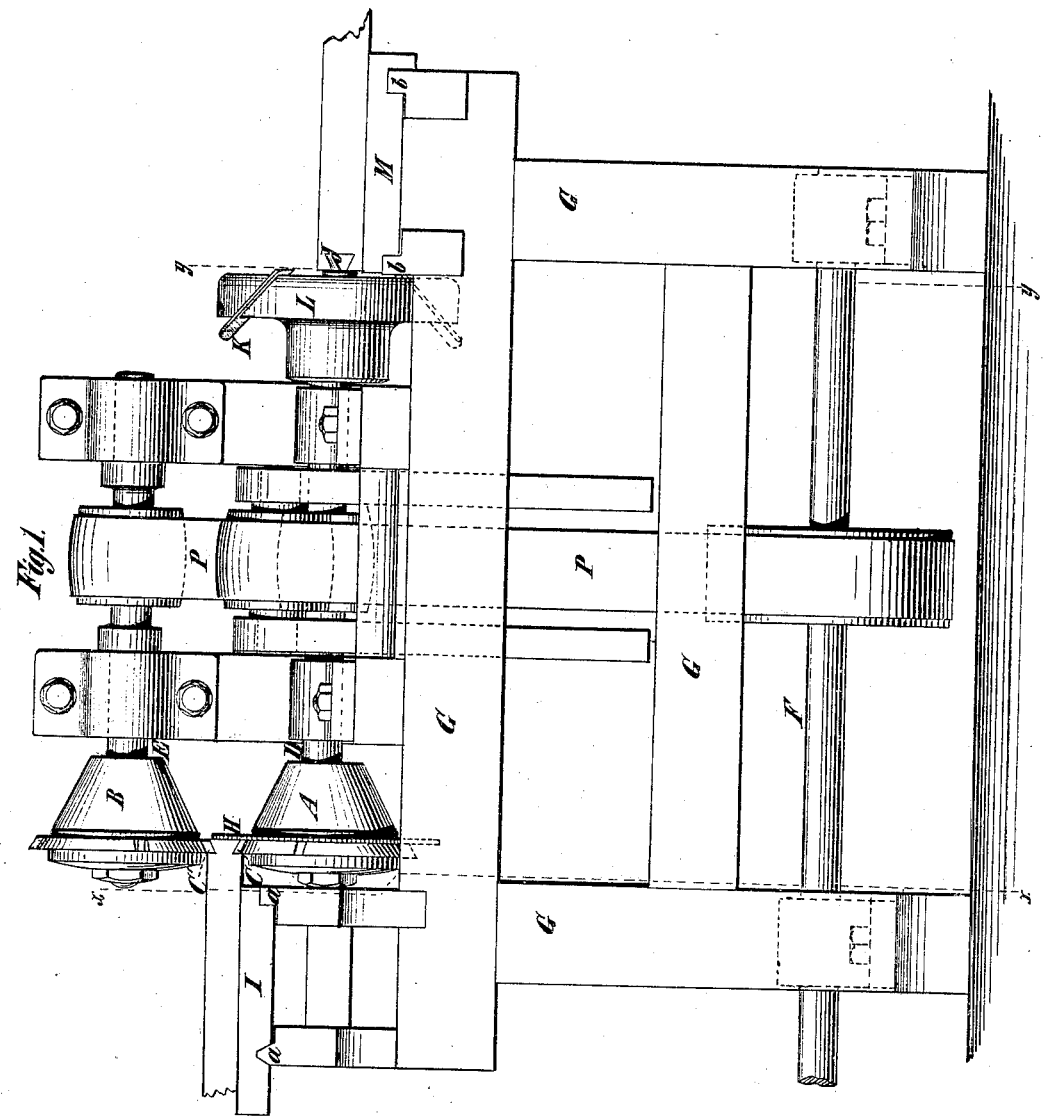

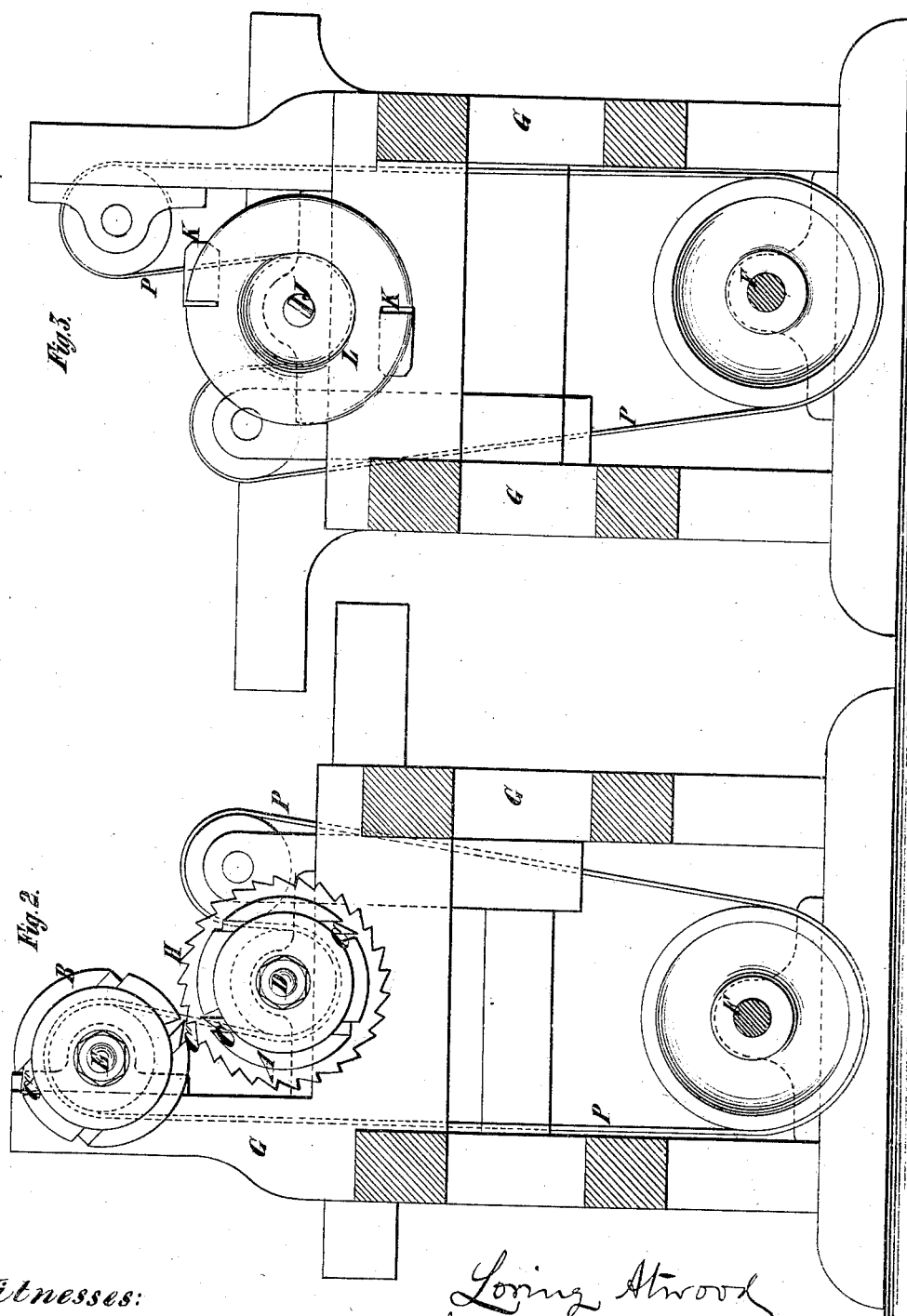

LORING ATWOOD, OF RUTLAND, VERMONT, ASSIGNOR OF ONE-HALF HIS RIGHT TO HENRY A. HALE, OF BROOKLYN, NEW YORK.

IMPROVEMENT IN DOVETAILING-MACHINES.

Specification forming part of Letters Patent No. 169,132, dated October 26, 1875; application filed August 7, 1875.

*To all whom it may concern:*

Be it known that I, LORING ATWOOD, of Rutland, in the county of Rutland and State of Vermont, have invented certain new and useful Improvements in Dovetailing-Machines; and I hereby declare that the following is a full, clear, and exact description of the same, reference being had to the accompanying drawings, which form a part of this specification.

This invention consists in the combination of a pair of rotary disks or chucks, arranged in the same vertical plane and carrying knives or cutters having oblique cutting edges, a rotary saw arranged to work close to the back of the said knives or cutters, and a sliding carriage for the work, whereby a complete dovetail tongue or tenon of uniform size and shape throughout its length may be cut at one operation, the knives or cutters carried by the rotary disks or chucks cutting the two diverging sides, and the saw cutting the end or outer side.

In the accompanying drawings, Figure 1 is a front view of a machine embodying my invention. Fig. 2 is a transverse section of the same, taken on the plane of the dotted line $x$ $x$, Fig. 1; and Fig. 3 is a transverse section taken on the plane of the dotted line $y$ $y$, Fig. 1.

A and B designate two rotary chucks or disks, carrying sets of knives or cutters C C', and mounted on shafts or arbors D and E, which are supported in bearings on a frame, G, and driven by a shaft, F, through the agency of a belt, P. The cutting-edges of each set of knives C C' are inclined or beveled outwardly toward those of the other set, so that together they will cut the two diverging sides of a dovetail tenon or tongue. The edges of the disks or chucks A B are also preferably beveled or inclined like the knives C C', so as to support or hold the latter steadily, and yet clear the sides of the tenon or tongue cut thereby. H designates a rotary saw arranged on the shaft D, and in such position that its outer edge works close to the inner edge of the knives or cutters C C', and hence cuts the face or outer side of the tenon or tongue at the same time that the sides thereof are cut by the said knives C C'. I designates a carriage arranged to slide past the cutters C C' and saw H on ways $a$ $a$, provided on the frame G. Motion is imparted to this carriage in any suitable manner, and the work or material on which the tenon or tongue is to be cut is placed thereon in such position that its inner edge will be subjected to the operation of the knives C C' and saw H as the carriage travels past them. It is obvious that as every part of the tenon or tongue is cut by the same implements (the cutters C C' and saw H) it will necessarily be uniform in size and shape throughout its entire length. J designates a longitudinally-inclined cutter or gouge, arranged, in the present instance, on a chuck, L, provided on the end of the shaft or arbor D, which is opposite the chuck A. This cutter or gouge is of such size and shape that it will cut in a piece of wood a dovetail groove of the same size and shape as the tenon or tongue cut, as before described, by the cutters C C' and saw H. The timber or wood to be dovetailed is placed on the carriage M, which is in position at one side of the chuck L, so that its end will be on a line with the face of said chuck. It is then advanced laterally to the inclined cutter, with just sufficient speed to allow said cutter to remove a thin chip or shaving at each revolution, until it has passed entirely through the wood. While this operation is going on, and the dovetailed groove is being cut through the wood, the inclined cutters K operate to plane the ends of the bar, thus cutting the groove and planing the ends at one operation. K K designate planing-knives projecting from the chuck near its periphery, and designed to plane, smooth, or trim off the edges of the material at the same time that it is grooved, in order to insure the same depth and shape to the grooved edge throughout its entire length, and thereby cause it to correspond with and fit the tenon or tongue cut by the cutters C C' and saw H. M designates a carriage arranged to slide on shears or ways $b$ $b$ past the chuck L and its cutter and planers. It may be operated in any suitable manner, and carries the work.

It will be seen from the foregoing descrip tion that, by this invention, provision is afforded for cutting a dovetailed tenon or tongue and a dovetailed groove to match the former, of uniform size and shape throughout their entire length, whereby the same are certain to fit one another, and the cost of manufacture materially reduced.

What I claim as my invention, and desire to secure by Letters Patent, is—

The knives C C', arranged on the shafts D and E, and having their cutting-edges inclined outwardly toward those of the other set to cut two diverging sides, in combination with the chucks A and B and the rotary saw H, arranged on the shaft D between the chuck A and knife C, so that its outer edge works near the inner edges of the knives, and cuts the face of the tenon simultaneously with the cutting of the sides thereof, substantially as described.

LORING ATWOOD.

Witnesses:
T. J. KEANE,
A. J. DE LACY.